United States Patent [19]

Levy

[11] Patent Number: 5,562,941

[45] Date of Patent: *Oct. 8, 1996

[54] PROCESS FOR IMPROVING THE TASTE OF BEVERAGES BY REDUCING BITTERNESS

[76] Inventor: Ehud Levy, 1000 Cobb Pl. Blvd., Bldg. 370, Kennesaw, Ga. 30144

[ * ] Notice: The term of this patent shall not extend beyond the expiration date of Pat. No. 5,096,721.

[21] Appl. No.: 386,201

[22] Filed: Feb. 9, 1995

Related U.S. Application Data

[63] Continuation of Ser. No. 28,162, Mar. 9, 1993, abandoned, which is a continuation-in-part of Ser. No. 832,031, Feb. 6, 1992, Pat. No. 5,192,571, which is a continuation-in-part of Ser. No. 606,307, Oct. 31, 1990, Pat. No. 5,096,721.

[51] Int. Cl.$^6$ ............................................. A23F 5/26
[52] U.S. Cl. .................... 426/433; 426/594; 426/595
[58] Field of Search .............................. 426/66, 78, 433, 426/435, 594, 595, 597, 590, 422, 424; 210/506, 507, 508, 509, 501, 902, 915, 282, 757, 754, 758, 756

[56] References Cited

U.S. PATENT DOCUMENTS

| | | |
|---|---|---|
| 1,777,546 | 10/1930 | Blumenberg, Jr. . |
| 2,036,345 | 4/1936 | Merkel . |
| 2,037,370 | 4/1936 | Esselen et al. . |
| 2,103,411 | 12/1937 | Frieden et al. . |
| 2,134,276 | 10/1938 | Roscher et al. ............................ 406/77 |
| 2,357,895 | 9/1944 | Higby . |
| 2,553,467 | 5/1951 | Neef . |
| 2,863,376 | 12/1958 | Grose . |
| 2,926,088 | 2/1960 | Spiselman . |
| 3,026,208 | 3/1962 | Gyorgyi .................................... 426/66 |
| 3,250,398 | 5/1966 | Adiletta . |
| 3,457,083 | 7/1969 | Kawai et al. . |
| 3,528,819 | 9/1970 | Hamilton et al. . |
| 3,753,726 | 8/1973 | Clinton et al. . |
| 3,889,000 | 6/1975 | Cante et al. ............................. 426/77 |
| 3,934,047 | 1/1976 | Schade . |
| 3,966,986 | 6/1976 | Hunter et al. . |
| 4,039,444 | 8/1977 | Bory et al. . |
| 4,087,583 | 5/1978 | Moore . |
| 4,160,042 | 7/1979 | Farr et al. ................................ 426/77 |
| 4,219,579 | 8/1980 | Piampiano . |
| 4,530,768 | 7/1985 | Tanihara et al. . |
| 4,642,192 | 2/1987 | Heskett . |
| 4,707,263 | 11/1987 | Nishimori et al. . |
| 4,975,292 | 12/1990 | Loizzi . |
| 4,983,410 | 1/1991 | Dinos ........................................ 426/77 |
| 4,999,109 | 3/1991 | Sabre . |
| 5,043,172 | 8/1991 | Loizzi . |
| 5,071,551 | 12/1991 | Muramatsu et al. . |
| 5,087,469 | 2/1992 | Acree . |
| 5,096,721 | 3/1992 | Levy ........................................ 426/66 |
| 5,178,768 | 1/1993 | White, Jr. . |
| 5,192,571 | 3/1993 | Levy ........................................ 426/78 |

FOREIGN PATENT DOCUMENTS

| | | | |
|---|---|---|---|
| 766309 | 10/1971 | Belgium ................................. 426/78 |
| 888351 | 1/1962 | United Kingdom ................. 426/78 |
| 2074532 | 11/1981 | United Kingdom ................. 426/78 |

OTHER PUBLICATIONS

Betz Handbook of Industrial Water Conditioning 7th Ed. 1976 pp. 24–29.
Coffee Technology Sivetz et al Avi Publ. 1979 pp. 680–684.
Manufacture & Analysis of Carbonated Beverages Chem. Publ. Co. 1959 Jacobs pp. 89–109.

*Primary Examiner*—Steven Weinstein
*Attorney, Agent, or Firm*—Penrose Lucas Albright

[57] ABSTRACT

Thiosulfate in anhydrous form is added in minute quantities to beverages such as soft drinks, citrus juices, coffee and a tea, or food mixes wherein tap water is added in quantities not greater than about two quarts and preferably not greater than about one quart, to neutralize or destroy chlorines or chloramines in the beverage and to reduce bitter tastes, such neutralization or destruction taking place almost instantaneously and, in any event, in a length of time not greater than about twenty seconds or, for most beverages, not greater than about three seconds, depending upon the pH of the beverage of food. The thiosulfate may be added directly to the beverage or to the water by metering apparatus or may have been previously applied in metered quantities to filters for the beverages including tea bags or may be mixed with syrup, powder mix, instant coffees or teas, coffee grounds or tea leaves, or may be encapsulated with a food grade material which is readily dissolvable in water. Because of rapid reaction of the thiosulfate with the chlorines and the chloramines, the neutralization or destruction of same is essentially complete before a person commences to consume the food or beverage. The thiosulfate may be applied in pellet form to beverages or applied to articles which are inserted into beverages or food or which receive same such as filter elements, tea bags, cups, stirrers, straws, and the like.

4 Claims, No Drawings

PROCESS FOR IMPROVING THE TASTE OF BEVERAGES BY REDUCING BITTERNESS

RELATED APPLICATIONS

This is a continuation of Ser. No. 08/028,162 filed Mar. 9, 1993, now abandoned, which is a continuation-in-part of Ser. No. 07/832,031 filed Feb. 6, 1992, now U.S. Pat. No. 5,192,571; which is a continuation-in-part of Ser. No. 07/606,307, filed Oct. 31, 1990, now U.S. Pat. No. 5,096,721.

FIELD OF THE INVENTION

This invention relates to a method and materials for removing chlorine and chloramines from chlorinated water as or before it is mixed with other substances to constitute a beverage or food which is intended to be consumed almost immediately following its preparation thereby improving the product's palatability, whereby the dechlorination is completed and the improvement occurs before the beverage or food is consumed. More particularly, it relates to the destruction of the products of hypochlorite used to disinfect tap water by metering small amounts of thiosulfate therein when or before that water is added to other substances to produce improved beverages or food, by the rapid autocatalytic reaction of thiosulfate with such products, the metering being accomplished by metering apparatus or by being applied to materials that receive the tap water such as filter elements, stirrers, straws and containers, whereby dechlorination and reduction in bitterness are complete before consumption of the beverage or food is commenced.

BACKGROUND OF THE INVENTION

Chlorine is often present in water from municipal sources as a result of disinfection processes. Chlorine (including chloramine) levels in municipal water supplies range up to about 3 ppm. These chlorines and chloramines, together with other substances which may be dissolved or present in municipal water supplies, affect its taste. They also control the water's pH at point of use which, when supplied from municipal water sources, is usually within a range of 6 to 9 pH and under EPA standards should generally be within a range of 6.5 to 8.5 pH.

Activated carbon filters at point of use comprise a well known means for removing chlorine from water. However, there are significant expenses incident to the necessary modifications to the plumbing, as well as the provision for and replacement of the filters. Moreover, a pressure drop occurs across such filters and their effectiveness for the removal of chlorines and chloramines is not always dependable.

It is also known that salts of the sulphur oxide family can be useful dehalogenation agents. Such agents include iron sulfate and thiosulfates such as sodium thiosulfate.

When adding sulfur oxides such as, for example, sodium sulfite and thiosulfates, to water, it is considered important to keep their proportions rather closely to those required for the reaction with the chlorine and chloramines therein, because greater proportions can cause a reducing effect which, although not injurious to health, is undesirable, and lesser amounts may not be sufficiently effective. When a thiosulfate is used to destroy the chlorine and chloramines resulting from hypochlorite disinfectants added to the water, these undesired substances are destroyed by an autocatalytic reaction with the thiosulfate at a molar ratio of about 0.25 moles of thiosulfate to 1 mole of hypochlorite.

Sulfite reaction times with chlorines and chloramines in tap water are reported to require minutes and sometimes hours or even days, and to be substantially dependent upon the temperature of the solutions, their pH values, and the particle sizes of the sulfites.

Sodium thiosulfate, which is the most readily available of the thiosulfates, is also known to have a cooling taste with a bitter aftertaste. It is, however, generally considered harmless and, for some purposes, beneficial in doses of a gram and less, and the same is true for calcium thiosulfate and magnesium thiosulfate. Unless otherwise qualified, the term "thiosulfate" as used herein refers to sodium thiosulfate.

SUMMARY OF THE INVENTION

I have discovered unexpectedly that the neutralization or destruction of chloramines and chlorines, when thiosulfates are added to limited quantities of tap water (generally up to about one-half gallon or two liters) in the very minute amounts (1.5 milligrams or less per quart or liter of water) as required by stoichiometric proportions, occurs very rapidly within a matter of seconds at most, and usually, in fact, in less than one second, often too quickly for accurate time measurements. The length of time for the reaction depends largely on the pH value of the water after being mixed or infused with the food or beverage material and the volume of water involved. Also, I have discovered that the dependence on the temperature for the specific applications is considerably less than anticipated and for almost all practicable purposes is nonexistent. For example, with soft drinks wherein the pH is generally in a range of 2.5 to 3.5, the destruction time is less than 0.5 seconds, and there is very little variation in this period of time irrespective of whether the liquid that is added is at a high temperature, nearly 100° C., or at a low temperature, nearly 0° C. The amount of sodium thiosulfate which is added is quite minimal being, for 8 ounces, about 0.125 milligrams. A preferred application of the thiosulfate is to the interior of a disposable container, such as a paper cup, or within the matrix of a filter as used for coffee making or as forming a tea bag.

Sodium thiosulfate used in accordance with the invention should preferably be a U.S.P. or food grade material of 99.5% purity or better. In fact, experience teaches that a very high purity 99.9% is needed to eliminate undesirable odors imparted to the material by the impurities. The amount of thiosulfate required to destroy chlorines and chloramines in most tap waters is so minimal that by using a thiosulfate of sufficiently high purity, there is no adverse or even noticeable taste imparted to the beverage or food to which the water and thiosulfate have been added. To the contrary, the thiosulfate reaction reduces the pH of the water and the resulting beverage or food, with few exceptions, tends to have its taste and flavor improved. This improvement occurs in addition to the removal of chloramines and chlorines which, per se, adversely affect the taste and flavor of the beverage or food.

Beverages into which the thiosulfate is added in small amounts have their taste improved due to the neutralization of chlorine therein. But it is also my theory that the taste may be further or independently improved in the products due to the neutralization of certain phenols and/or alkaloids. I am uncertain precisely what causes the resulting reduction of bitterness in addition to the destruction of the chlorine and chloramines therein. However, it is my present theory that the thiosulfate may be changing the oxidation state of an adjacent electroactive peak and thereby causing the increase in at least one of a pair of homolog compounds. One example is the chemical change from quinone to hydroquinone.

Coffee has an extremely complex chemistry. There are thousands of types of coffee available in the world. The chemical composition of coffee becomes visible when viewed with the aid of high performance liquid chromatography HPLC. When viewed in this manner, it can be seen that most coffees contain some arabica and some robusta. My studies indicates that coffee which contained robusta also contained twice the amount of phenols or alkaloids compared to coffee which contained arabica. Further, tests conducted with the aid of a HPLC demonstrated that when small quantities of thiosulfate were added, a reduction occurs in some phenol groups from approximately 50% to 95%.

These phenol groups are be identified as catechins, gallocatechins and flavones. Polyphenols can be highly complex. Each polyphenol contains approximately twenty to thirty different compounds. When tests were performed on a coffee which contained a blend of four different types of beans, four separate reductions in phenol groups became visible.

A possibility exists that the reduction in the bitter taste in the coffee beverage results from the modification of the chloragenic acid which is actually modified by the introduction of the thiosulfate. The resulting modification reduces the bitterness of the coffee beverage.

When water that is used to make a coffee beverage contains a high concentration of chlorine, the bitterness is typically extremely high. However, it has been found that the introduction of relatively small quantities of thiosulfate to the water reduces the quantity of phenols therein and the coffee's bitterness is moderated even in the absence of chlorine in the water prior to treatment. This moderation of the bitterness of the coffee not only improves the flavor of the coffee but also improves the aroma thereof It is not unusual for coffee drinkers in many countries to add milk to their coffee to reduce the bitter flavor. Chemically, by the addition of milk to the coffee beverage, the polyphenol concentration is neutralized. This neutralization of the polyphenol concentration is known to reduce the bitter taste of the coffee beverage. But, unfortunately, when milk is added to reduce the bitter taste in the coffee or tea, it also tends to mask the desirable flavor and aroma of the beverage. Alternatively, when thiosulfate is added to the coffee or tea, not only is the bitterness reduced, but the coffee's desirable flavor and the aroma seem to remain intact.

Excessive bitterness is also a major problem in the citrus industry, especially in the processing of juice products. Bitterness in both fresh and processed fruits may exceed that preferred by many consumers. The principal bitter component in navel and valencia oranges is triterpenoid dilactone called limonin, and it is also found as the bitter component in grapefruit. Limonin is not present to any extent in fresh fruits, but rather a flavorless limonin derivative produced by insymatic hydroysis of limonin's D-ring lactone is the predominate form. After juice extraction, however, acidic conditions favor the closing of the D-ring to form limonin, and the phenomenon of delayed bitterness occurs, yielding serious economic consequences.

The citrus industry today uses a complex and expensive process for effectively reducing the bitter taste in grapefruit juice and orange juice. I have discovered that by the introduction of relatively small quantities of thiosulfate into the extracted juice the bitter taste is reduced and the flavor is improved.

The citrus industry uses immobilized enzyomes from Arthrobacter sp. and Acinetobacter sp. that open the D-ring lactone to de-bitter orange juice. This technique only provides a temporary solution to the bitterness problem because the ring closes again when exposed to acidic conditions. A complex process is available whereby limonoate dehydrogenase is used to convert the open D-ring compound to non-bitter 17-dehydrolimonate A-ring lactone provides an irreversible conversion of the D-ring compound to produce de-bittered orange juice. This process, however, has not yet been commercialized and tends to be quite expensive.

In contrast, the use of thiosulfate to reduce the bitterness in citrus beverages, far fewer chemicals are required, is less costly than conventional commercial practice and ultimately will reduce industrial costs associated with the production of citrus beverages.

In cases wherein a decrease in the pH of the resulting beverage or food may adversely affect its flavor or taste, a buffer can be added to retard the reduction of the pH value.

The thiosulfate can be added not only to containers, and coffee filters, but also to other articles which come into contact with the water, such as tea bags and paper filters or disks for use in or with pitchers, carafes and bottled water. Webs used for tea bags are generally soft, tissue-thin fibrous materials characterized by lightweight and freedom from rupture in boiling water. Coffee filters commercially available from Mr. Coffee, Inc. of Bedford Heights, Ohio, manufactured by the chlorine free process, have been successfully used with the invention by having thiosulfate incorporated in their matrix by injecting thiosulfate solution through as many as twelve stacked filters at once. The fibers can be any of a well known number of paper making fibers or mixtures thereof, for example, natural fibers such as manila hemp, caroa, jute, bleached or unbleached kraft, sisal and kozu or synthetic fibers, such as viscose and acetate, rayon, polyamides, vinyl acetate-vinyl chloride copolymers, wherein the addition of the small amounts of thiosulfates can be incorporated in the webs, per se, or mixed with the coffee or packaged tea. In either case, the diffusion is almost immediate although tea bags should be left for two or three minutes in boiling hot water for best results.

Coating or impregnating coffee paper filters and tea bags with thiosulfate for removal of undesirable taste, chemicals and the like, improves the coffee or tea. Moreover, the coffee filters may, as indicated above, have liquid thiosulfate solutions sprayed thereon in stacks of twelve wherein the thiosulfate, in adequate amounts, is incorporated into each filter. For tea bags, impregnation by thiosulfate in amounts of 0.1 to 0.7 milligrams per liter of water used for making the tea beverage is effective depending on the concentration of chlorine in the water to which the tea bag is to be used for brewing tea. Thiosulfate powder can, as an alternative, be mixed with the tea leaves in the tea bags at a concentration level of 0.4 to 0.6 milligrams per liter, and with instant tea at 0.2 to 0.5 milligrams per liter.

Thiosulfate in accordance with the invention can also be mixed directly with solid food material, syrups, powders or mixes of sugar, or other items which come into contact with water. This includes non-foods such as liquid and powdered soaps. It can also be used to eliminate chlorine and chloramines in drinking water, as such, at point of use. It can be mixed with artificial sweeteners, in powder form or liquid, which may be added to tea, coffee and other drinks such as cocoa to eliminate the taste of chloramines and chlorines.

As indicated above, ordinary city water generally contains up to about 3 ppm of chlorine, whereby the amounts of thiosulfate required to eliminate the chlorine from the water is quite small. It eliminates not only the taste of chlorine, but also the odor of same, and, as discussed, generally improves the taste of the product. Tests have shown that traces of salts and sulfates at less than 0.5 mg per liter to less than 0.05 mg per liter remain in the water so treated. This is below by an order of magnitude the E.P.A. standard minimum of 250 mg per liter or the FDA maximum of 0.1% in food products.

The invention is applicable to almost any situation wherein tap water, which has been disinfected by chlorine or chlorine containing compounds, is used, and many situations wherein food or beverage products are unduly bitter.

When the pH in the water is less than 6, the chlorine is converted to hypochlorous acid (HOCl). When the pH is greater than 9, the chlorine reacts with the water to form $OCL^{-e}$, which reacts and destroys ammonia which tends to cause the taste of teas, coffees and other natural flavors to be flat.

Possible chlorine related couples which may occur in aqueous solutions include the following:

TABLE I

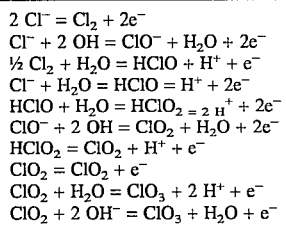

An important object of the invention is to convert undesirable chemical species to those which are neither harmful nor otherwise objectionable. To the extent that city water is involved, this occurs with the destruction of the chlorine and chloramines that were added to the water, usually as hypochlorite, for disinfection purposes. Inasmuch as HOCl constitutes a weak acid, it should be appreciated that the pH value plays a most important role in the thermodynamics of thiosulfate oxidation reactions. Where the pH is in excess of 9, a small amount of sodium borate ($Na_2B_4O_7 \cdot 10H_2O$) may be used to reduce and control the reduction of the pH level.

When tea bags, filters, cups and the like are stored and sold in hermetically sealed containers, the amount of thiosulfate desired can be sprayed onto or into each container as appropriate, either directly or mixed with water or with a mixture of gelatin and water. Although in substantially greater amounts, various methods for applying provided materials to containers are disclosed in U.S. Pat. No. 4,312,889, of Melchelmer. In addition, for long term storage, thiosulfate particles, which preferably have a particle size of about 5–30 microns, can be encapsulated in a water soluble matrix of materials such as taught by U.S. Pat. No. 3,971,852, of Brenner et al.

Factors to be considered in how the thiosulfates are applied and whether or not they should be encapsulated or pH buffers should also be used with them, include the type of packaging for the product, that is whether or not hermetically sealed, the expected shelf life of the product, and whether the product contains any substances with which the thiosulfates may react which may preempt or substantially preclude their desired reaction with the chlorines and chloramines. Also, the specific thiosulfate used or mixture thereof may require some experimentation to determine the optimum quantity or type of thiosulfate or mixture. But, as stated above, because of its ready availability, sodium thiosulfate is the preferred thiosulfate. Otherwise, only the magnesium and calcium thiosulfates are recommended for use in the invention for beverages or foods, although potassium thiosulfate should not be overlooked as a possible substitute.

When a thiosulfate is to be bonded or encapsulated, it is important that this be accomplished by a food grade material mixed with the thiosulfate.

The thiosulfate can be added to products which subsequently are mixed with water containing chlorines and chloramines, such as frozen liquid concentrates for beverages, e.g., orange juice or lemonade, in syrups for soft drinks such as Coca-Cola and Pepsi-Cola, with mixtures such as freeze dried tea and freeze dried or instant coffees, and with mixtures intended for alcoholic drinks wherein water is also added. It also can be premixed with sweeteners including artificial sweeteners, whereby the resulting product both sweetens and removes chemicals such as chlorines and chloramines and may otherwise moderate bitterness simultaneously.

It has also been found that the thiosulfate can be premixed with baking products as well as other food products, which prescribe the use of added water such as cake mixes, pizza mixes, soups and soup mixes, flour, yeast and the like. Bakery products which use tap water for mixing with the flour or other mix, upon being baked, rise about 5–10% higher than without the addition of thiosulfate.

Thiosulfates can also be added to drinks, in much the same manner as small grains or pellets of sweeteners are added to liquids, including adding same to water, as such, including bottled water and to premixtures for drinks which may or may not include liquids.

Thiosulfates can further be added to dispensing machines, wherein cups are automatically filled with a syrup and a carbonated water by being added to the water or to the syrup, or being preaffixed to the interior of the paper cup for receiving the beverage. It can also be added by a separate dispenser in a drop of water or as a small pellet. For drinking fountains and dispensing machines which are connected to, or which use containers filled with tap water, thiosulfate can be introduced as an additive to the water at any convenient location in the pipeline, which conveys the tap water to its point of use, by known types of metering devices such as disclosed in U.S. Pat. Nos. 3,380,467 of Diehl, Jr. et al; 3,642,171 of Ernst; 4,321,938 of Siller; and 4,369,805 of Tavor. Thiosulfate can be incorporated into yeast, dried or in cake form, wherein the yeast is used for baking products to which tap water is added in order to make the performance of the yeast more uniform, as well as to improve it and the quality of the baked product.

Although the primary object of this invention is directed to the addition of thiosulfate in small amounts to relatively small quantities of water not greater than about one-half gallon, generally one quart and preferably twenty-four ounces or less, it can also be added to bottled water or larger volumes of water, wherein there is no need for the destruction of the chlorines and chloramines to occur almost immediately or at least within a matter of a few seconds. Also, wherein substantial concentrations of hypochlorite water solutions are passed through conduits to destroy flora or fauna growing therein, the addition of thiosulfate to the solutions discharged from such conduits constitutes an environmentally acceptable treatment to neutralize the hypochlorite and resulting products, particularly for water treatment plants that have their inlets in lakes or rivers.

DESCRIPTION OF THE PREFERRED EMBODIMENTS

An important aspect of the present invention involves the discovery that thiosulfates can be added to a relatively small volume of water up to about two liters and preferably about a liter or less, which contains chlorines and chloramines within the limits generally prescribed for water from municipal water sources, whereby the chlorines and chloramines are destroyed almost immediately without adversely affecting the taste of the water. The thiosulfate in combining with the chlorines and chloramines and other substances in the water, does not add more than very minimally to the salts and other materials usually present in tap water. The tastes of beverages or foods made by the mixing of water therewith are improved to the extent that the chlorines and chloramines have been removed and also, with most foods and beverages, because the pH level of the mixture has been reduced. Further, the bitterness in foods and beverages may be otherwise moderated as discussed above. The discovery also encompasses the circumstance that the time lapse required to destroy the chlorines and chloramines is primarily sensitive to the pH of the water and substantially insensitive to its temperature. How the thiosulfate is added and the turbulence of the mixture may also play a part. For example, filters impregnated with thiosulfate may be used successfully with larger quantities of water. With a pH as low as 2.5, the chlorine and chloramines are destroyed essentially instantly. With a neutral pH of 7, the destruction time is approximately three seconds. When the pH is as high as 8, which is very rare for the applications involved, the approximate destruction time is ten seconds and with a pH of 9, it is double that, or about twenty seconds. Finally, when the pH is as high as 10, a lapse of about thirty seconds can be expected. If it is anticipated that the pH of the water will be above 9, and the substance to be mixed with the water will not lower its pH, which is extremely unlikely not to occur, then a buffer solution may also be added to accelerate the process with the buffer solution acting to reduce the pH value to approximately 7. Thus, it will be appreciated that with a limited amount of water only (about one liter or less) when the pH value is approximately 10 or higher, the time period required for the destruction of the chlorines and chloramines in the water may be greater than one minute. But with tap water added to form a beverage or food in accordance with the invention, such a long time lapse is yet to be experienced. With thiosulfates, when the pH is at lower levels, the reaction is accelerated and becomes autocatalytic. The utility of the invention thus depends for most applications on the lapse of time likely to occur between when the thiosulfate is added to the water and when it is consumed. For example, for coffee or drinking apparatus using filters to which thiosulfate has been added, a minute or more may be available, wherein with a soft drink dispensing machine, the time lapse may be as short as two or three seconds. It will also be understood that the pH value of the water when it dissolves the thiosulfate, and the time lapse for the reaction to take place prior to consumption, tend to govern the amount of water than can be used and may permit the use of water in batches that significantly exceed one liter or one quart.

In an aqueous solution, a chlorine is hydrolyzed to produce an equilibrium of the ions of chlorine and hypochlorous acid. The equilibrium is such that if the pH has a value of about or somewhat greater than 3, and the chlorine is about 3 ppm, there is little or no molecular chlorine present. As the pH approaches but is under 6, whatever chlorine is in the water is readily converted to hypochlorous acid. With the pH of the water greater than 9, the chlorine reacts with water to form the negative ion $OCl^{-e}$, a species which is reactive with ammonia. Accordingly, it will be appreciated that the pH value determines the distribution of chlorine between the two species, the negative ion $OCl^{-e}$, and HOCl.

In water treatment plants, oxidation is used to convert undesirable chemical species to those which are neither harmful nor otherwise objectionable. However, as a practical matter, it is not possible totally to eliminate all undesired constituents from the water. Thus, chemical oxidation processes are employed primarily to reduce the concentration of inorganic chemicals containing manganese, iron, sulfides, cyanamides and sulfites, and organic substances such as phenols, amines, humic acids, and other taste, odor or color producing substances as well as toxic chemicals, bacteria and algae. The most frequently used oxidizing agents based on cost, effectiveness, ease of handling, history, and considering subsequent treatment steps, as well as the specific type of oxidation involved, are oxygen or air, ozone, hydrogen peroxide, potassium permanganate, chlorine or hypochlorites and chlorine dioxide. Depending upon the chemicals present in the water, all types of oxidation-reduction reactions may occur.

Those who direct water treatment should have a precise knowledge of the reactions, products, and conditions present. Nevertheless, a trial and error approach is often necessary. For example, water may be treated at a municipal treatment plant by the addition of lime to raise the pH and thus, cause the precipitation of calcium and magnesium with alum being added simultaneously to facilitate sedimentation. Then carbon dioxide may be added to lower the pH and powdered activated carbon added to control taste and odor. A chlorination process is often included wherein chlorine is added to raise the parts per million of the water to approximately 8 ppm with a contact time of, say, six hours. A thiosulfate may be added to eliminate residual chlorine at a stoichiometric ratio of sulfite to chlorine in amounts about three times that necessary. Remaining chlorine then may be converted to a monochloramine by the addition of ammonia at a two fold excess over the residual chlorine. This also largely suppresses mutagen production. The water is then filtered and again chlorine may be added in the form of hypochlorite to bring the chlorine content to about 3 parts per million. A typical pH may range from 7.5 to 8.5 or somewhat higher.

Because of this treatment and also to some degree, in spite of it, water received at point of use in the home or otherwise usually has about 1 to 3 parts per million chlorine content and other substances are dissolved in the water such as lime, various metals, amines, humic acids and certain levels of bacteria, algae and sulfites. The specific content of these substances varies from place to place depending upon the source of the water and the treatment accorded to the water.

Because of the variations in water sources and treatments, the various mixtures of tap water with substances to provide beverages or other foods may result in different tastes from area to area. To complicate this, populations of different areas tend to become accustomed to their water, whereby when travelling they may find beverages and foods taste quite differently from what they remember from home, as well as different from what the local inhabitants seem to experience.

Although chlorine and chloramines as well as other impurities in water can be removed, or at least substantially reduced by various filtration processes at point of use, these processes require a certain amount of time for contact with the water, space, capital costs and inconveniences incident to maintenance and replacements, as well as reducing the effective water pressure at the faucet.

I have discovered that essentially the same advantages achieved by filtration, if not greater advantages, can be obtained through the removal of chlorines and chloramines by the addition of sulfite salts and, particularly, by the addition of thiosulfates to the water immediately prior to or during preparation of the foods or foodstuffs. I have used for this purpose, primarily and preferably, sodium thiosulfate. But calcium thiosulfate and magnesium thiosulfate may also be used and, under certain conditions, potassium thiosulfate may be employed. In each case the anhydrous thiosulfate is preferred. These thiosulfates may be applied individually or in combination. Preferably the thiosulfate should be at least 99.9% pure or better to eliminate undesirable odors that may be caused by the impurities.

The thiosulfate may be bonded directly or by the use of food grade bonding material, to paper and other disposable cups and drinking containers. A sixteen ounce container requires not more than 0.75 to 1.0 milligrams per liter of thiosulfate bonded to the interior of the cup. The temperature at which the tap water is added to the container, it has been found, has very little effect on the rapidity of the reaction of the thiosulfate with the chlorines and chloramines in the water. The length of time required for reaction is determined almost entirely by the pH of the mixture and, as a practical material, is essentially immediate. Inasmuch as the water is usually being added to a powder or syrup mix, or being added simultaneously therewith, and because most beverages have a pH value of less than 7, the destruction of the chlorines and chloramines in the beverage occurs in less than three seconds. There is also is a significant reduction or destruction of organic substances such as amines, humic acids, bacteria, algae and metals ions dissolved in the water. The beverage tastes, such as the tastes of tea and, in most cases, coffee, are substantially improved compared to the same beverages without the thiosulfate having been added. Although sodium thiosulfate is known to provide a cooling taste with a bitter aftertaste, the amount added is so minute that the taste of the thiosulfate, as such, is not detectable.

Most beverages have relatively low pH values. Accordingly, thiosulfate can be added by a dispensing machine for a soft drink either diluted in water, applied to the container as described above or mixed in the soft drink syrup or powder. Because the reaction time is less than three seconds, and usually is essentially immediate, by the time the person using the dispensing machine commences to drink the beverage, the reaction is substantially complete whereby the individual appreciates the improved taste due to the elimination of chlorines and chloramines from the beverage.

If the thiosulfate is added to a hot beverage such as coffee, it can be mixed with the coffee material, per se, applied to the container for receiving the coffee in either dry or liquid form or applied to a coffee filter. In practice, it has been found that thiosulfate in solution form can be injected into stacks of twelve coffee filters with each filter receiving and incorporating a sufficient amount of thiosulfate into its matrix for subsequent effective neutralization of the chlorines and chloramines in the water during the coffee making process and significantly to improve its flavor. Tests were conducted utilizing Mr. Coffee® coffee filters which had been treated as set forth above with thiosulfate to determine if the filter reduced chlorine in the drinking water without adding additional substances to the water. The tests were conducted in accordance with NSF standards 42 and 53. A Mr. Coffee model SR-10 coffee maker and treated filters in accordance with the invention were used for the evaluation. The filters were composed of filter paper formed in the shape of cups having circular bottoms of about nine centimeters in diameter and serrated diverging sides about 5.5 centimeters in length to form the open top portion having a diameter of about thirteen centimeters, the filter being filled with coffee and used in the normal manner in the coffee maker. Each filter had sodium thiosulfate applied thereto in the bottom portion in amounts which ranged from one to five 0.5 to 0.8 milligrams and at an average of 0.65 milligrams. The filters were produced by a chlorine-free process, thus eliminating therefrom chlorine and chloramines. Five one-liter aliquots of tap water were poured through the coffee maker prior to testing to ensure that residual particulate matter which may have accumulated in the coffee maker during shelf storage did not influence the-results of the test. Testing consisted of pouring 1,150 milliliters of tap water through the coffee maker during the brew cycle and collecting the effluent in a glass carafe. The influent tap water temperature was 24° C. and the effluent temperature was 83° C. Immediately following the brew cycle, the effluent was poured into the appropriate glass containers for analysis After cooling to 40° C., the remainder of the effluent sample was poured into the appropriate plastic container. The containers, appropriate preservatives, and analysis performed are detailed in Table II. In addition, the tap water sample was analyzed for turbidity, alkalinity and total residual chlorine.

TABLE II

CONTAINERS AND PRESERVATION OF SAMPLES FOR MR. COFFEE FILTER TESTING

| CONTAINER | ANALYSIS | METHOD | PRESERVATIVE |
|---|---|---|---|
| 500 mL Glass | Total Organic Carbon | EPA 415.1 | NONE |
| | Total Dissolved Solids | EPA 160.1 | cool to 4° C. |
| | Nitrate | EPA 353.1 | |
| | Sulfate | EPA 375.4 | |
| 40 mL VOA vial | Total Residual Chlorine | EPA 330.5 Hach Kit DR 100 | no head space |
| 250 mL Plastic | Calcium | EPA 200.7 | $HNO_3$ to pH < 2 |
| | Iron | EPA 200.7 | cool to 4° C. |
| | Magnesium | EPA 200.7 | |
| | Potassium | EPA 200.7 | |
| | Sodium | EPA 200.7 | |
| 125 mL Glass | Total Phosphorus | EPA 365.4 | $H_2SO_4$ to pH < 2 |
| | Ortho phosphate | EPA 365.1 | cool to 4° C. |
| 250 mL Glass | pH | EPA 150.1 | cool to 4° C. |
| | Turbidity | Hach Model 2100A | |
| | Alkalinity | SM 2320 | |

EPA-Environmental Protection Agency
SM-Standards for the Examination of Water and Wastewater, 17th Ed., 1989

Each test consisted of four runs. One was a control run of the assembled coffee maker without a filter. The other three runs utilize the same assembly with the treated filter for each. The results of the first test are summarized in Table III below with the exception of residual chlorine, the concentrations of compounds did not differ appreciably between the control sample and the test with the filters. For total residual chlorine, a decrease in concentration as well as of using the filter is evident. The coffee maker alone reduced chlorine concentration by 61%. The treated filter reduced the chlorine concentration by an additional resulting in an overall reduction of 86%.

TABLE III

RESULTS FROM MR. COFFEE FILTER TESTING

CONCENTRATION (mg/L)-except as noted

| ANALYSIS | TAP WATER | NO FILTER | FILTER NO. 1 | FILTER NO. 2 | FILTER NO. 3 |
|---|---|---|---|---|---|
| Chlorides | — | 6 | 6 | 6 | 6 |
| Total Residual Chlorine | 0.9 | 0.35 | 0.17 | 0.11 | 0.11 |
| Nitrate Nitrogen | — | 0.34 | 0.36 | 0.38 | 0.42 |
| Sulfates | — | 6 | 5 | 5 | 6 |
| Orthophosphate | — | <0.05 | <0.05 | <0.05 | <0.05 |
| Total Phosphorus | — | <0.05 | <0.05 | <0.05 | <0.05 |
| Total Organic Carbon | — | 2.16 | 2.66 | 2.44 | 3.51 |
| Total Dissolved Solids | — | 59 | 60 | 60 | 63 |
| Alkalinity (as $CaCO_3$) | 22.8 | 24.7 | 23.9 | 24.4 | 23.6 |
| Calcium | — | 9.99 | 9.66 | 9.68 | 8.65 |
| Iron | — | 0.042 | 0.034 | 0.033 | <0.03 |
| Magnesium | — | 1.14 | 1.14 | 1.12 | 0.97 |
| Potassium | — | 1.42 | 1.4 | 1.44 | 1.26 |
| Sodium | — | 4.72 | 4.65 | 4.13 | 4.12 |
| pH | 8.86 | 7.3 | 7.2 | 7.42 | 7.25 |
| Turbidity | .23 NTU | .3 NTU | .26 NTU | .3 NTU | .28 NTU |

Table IV presents results of a testing for total residual chlorine. The coffee maker alone reduced chlorine concentration by 71%. The filter reduced the chlorine concentration by an additional 83% resulting in an overall reduction of 95%.

TABLE IV

RESULTS FROM MR. COFFEE FILTER TESTING FOR TOTAL RESIDUAL CHLORINE

TOTAL RESIDUAL CHLORINE (mg/L)

| SAMPLE | TAP WATER | NO FILTER | WITH FILTER |
|---|---|---|---|
| 1 | 1.0 | 0.27 | 0.06 |
| 2 | 1.0 | 0.29 | 0.04 |
| 3 | 1.0 | 0.30 | 0.04 |
| AVERAGE | 1.0 | 0.2883 | 0.0467 |
| STANDARD DEVIATION | 0 | 0.01258 | 0.01153 |

It can be concluded that pouring tap water through the Mr. Coffee maker without a filter significantly reduced chlorine concentration. The addition of the treated filter resulted in an additional reduction. The reduction in free residual chlorine in tap water was accomplished without affecting the concentration of the other water constituents that were analyzed in the study.

The amount of thiosulfate which is to be added to the water can, if desired, be customized to the water of the local area. Thus, for example, wherein the chlorine levels are less than the usual maximum of 2.5 or 3 ppm, lesser amounts of thiosulfate may be used. However, even if more thiosulfate is added than required to neutralize or destroy the chlorine, which is 0.25 to 1 on a molecular basis to the stoichiometric amount of chlorine and chloramines present in the water, the thiosulfate is harmless in any event, being well below the maximums prescribed by the FDA and EPA. Further, bitterness in some beverages and foods may be improved in any amount as discussed above.

Tea, containing tannic acid, generally has a naturally low pH (3 to 7, but usually nearer to 3 than 7) which causes thiosulfate to combine almost immediately (three seconds or less) with chlorines when it is added to hot tap water containing chlorine and therefore thiosulfate is advantageously impregnated in tea bags, blended with tea leaves to be used for making teas, or mixed with instant tea. Thiosulfate is impregnated in tea bags at a capacity of 0.1 to 0.7 milligrams per liter based upon the amount of water to be used with the tea bag in producing the tea beverage. It is blended with tea leaves at a concentration level of 0.4 to 0.5 milligrams per liter, and mixed with instant tea at 0.2 to 0.5 milligrams per liter.

The thiosulfate can be dispensed in pellets, liquid drops or bonded or otherwise affixed to a filter or container or other material which filters or the containers or other materials may contain the mix or the beverage, or both. It also may be encapsulated in substances which are harmless, as such, to humans and which dissolve readily in water. This is important when a long shelf life is desired or when adding the thiosulfate directly to the mix to prevent unwanted reactions between the thiosulfate, per se, and the substances of the mix before use. Many items such as filters for coffee and the cups in a dispensing machine need not have long shelf lives and any requirement to protect by encapsulation or covering the thiosulfate bonded in such filters and cups is not, in most areas, a problem if normal packaging procedures are followed. On the other hand, wherein long shelf life is desired, it is important that the encapsulation or covering substances not only be readily dissolvable in water but also capable of being so dissolved in a manner of a second or so, to permit rapid dispersion and diffusion of the thiosulfate into the surrounding liquid.

In addition to applying thiosulfates to containers, powdered mixes and syrups or concentrates, it also can be applied to articles which are used to stir or otherwise are placed in liquids wherein the thiosulfate reaction with the chlorine and chloramines is desired. Examples are plastic or wooden spoons used for stirring, stirrers, as such, and straws which are inserted into liquids. With straws, minor amounts of thiosulfate may be applied both to their inner and outer surfaces or to either. A process for applying thiosulfate to such articles will be understood by reference to U.S. Pat. No.

3,252,803, of Belasco which, although it does not relate directly to thiosulfates, discloses how edible solvents can be adhesively applied to spoons and spatulas as well as cups.

Treatment of tap water in accordance with the invention results in a small amount of added salt, NaCl and sodium sulfates where sodium thiosulfate is used or corresponding salts with the other thiosulfates. However, the additional salts are so minimal that they are insignificant and harmless to those who avoid salt for dietary reasons.

Although I have described the preferred embodiments of my invention, it is understood that it is capable of other adaptations and modifications within the scope of the appended claims.

Having disclosed my invention, what I claim is new and to be secured by Letters Patent in the United States is:

1. A process for reducing the bitter taste in a coffee beverage produced, at least in substantial part, from robusta coffee beans that contain phenols and alkaloids causing said bitter taste comprising the steps of introducing water which is used for making said beverage into a receptacle of a coffee maker that holds a filter and coffee grounds of said robusta coffee beans, said filter having added to it a material consisting of an alkali metal or alkaline earth metal thiosulfate selected from the group consisting of sodium thiosulfate, magnesium thiosulfate and calcium thiosulfate, in an amount of about1.5 milligrams per liter of said water or less and sufficient to react with said phenols and alkaloids in said coffee grounds to reduce the bitterness in said coffee beverage caused by said phenols and alkaloids as said water passes through said coffee maker, said water being introduced in an amount and at temperature sufficient to wet the coffee grounds and to brew and produce the coffee beverage.

2. A process for reducing the bitter taste in a coffee beverage in accordance with claim 1, wherein said coffee grounds contain phenols from the group consisting of catechins, gallocatechins and flavones.

3. A process for reducing the bitter taste in a coffee beverage comprising the step of introducing water which is used for making said beverage into a receptacle of a coffee maker that holds a filter and coffee grounds therein produced in major part from robusta coffee beans which cause said bitter taste due to phenols and alkaloids in said robusta beans, said filter having added to it a material consisting of an alkali metal or alkaline earth metal thiosulfate selected from the group consisting of sodium thiosulfate, magnesium thiosulfate and calcium thiosulfate, in a quantity of about 1.5 milligrams per liter of said water or less and sufficient to react with the phenols and alkaloids causing said bitterness to reduce the bitterness in said coffee beverage, said water being introduced in a quantity and at a temperature sufficient to wet the coffee grounds and to brew and to make the coffee beverage received by and flowing through said filter and coffee grounds.

4. A process to reduce the bitter taste in a coffee beverage that is primarily caused by the use of phenol and alkaloid containing robusta coffee beans for making the coffee beverage, the process comprising introducing during said coffee beverage making process a substance consisting of an alkaline earth metal thiosulfate selected from the group consisting of sodium thiosulfate, magnesium thiosulfate and calcium thiosulfate in an amount of about 1.5 milligrams or less per liter of the coffee beverage, such that said thiosulfate reacts with the phenols and alkaloids sufficient to reduce the bitterness in the coffee beverage.

* * * * *